Jan. 13, 1970        P. E. HOWE        3,488,855

OIL LEVEL GAUGE

Filed Aug. 24, 1967

Inventor
Philip E. Howe
Attorney

United States Patent Office 3,488,855
Patented Jan. 13, 1970

3,488,855
OIL LEVEL GAUGE
Philip E. Howe, Homewood, Ill., assignor to Allis-Chalmers Manufacturing Company, Milwaukee, Wis.
Filed Aug. 24, 1967, Ser. No. 662,967
Int. Cl. G01f 23/04
U.S. Cl. 33—126.7
2 Claims

ABSTRACT OF THE DISCLOSURE

An ullage rod for measuring the oil level in an internal combustion engine. The rod is received in a tube which is fixed in the engine housing. A flat portion of the rod is twisted at 90° to a remaining flat portion so that the rod is centered and the measuring surface kept out of contact with the inner periphery of the tube.

This invention relates to an oil gauge and more particularly to an oil level measuring means for indicating the oil level in an engine reservoir.

The conventional oil level measuring rod is supported on its upper end, and depends into the oil reservoir unsupported for a substantial distance on its lower end. This may cause a false reading on the oil measuring rod. A further problem is that the oil measuring rod may bear on the side of the tube in which it is inserted while the rod is withdrawn from the engine. This may require the repositioning of the oil measuring rod in the reservoir to obtain an accurate reading of the oil level. Accordingly, this invention will overcome these problems and accurately measure the oil level by consistently positioning the rod in the same position every time and avoiding any smear as the oil measuring rod is withdrawn from the reservoir.

It is an object of this invention to provide an oil gauge which consistently produces an accurate reading of the oil level.

It is another object of this invention to provide an oil measuring rod which will prevent smearing of the oil level indicating surface as it is withdrawn from a retainer tube.

It is a further object of this invention to provide an oil measuring rod which is centered during its measuring position and maintained within a central position when the rod is withdrawn from the engine.

The objects of this invention are accomplished by positioning a tubular member to extend into the oil reservoir of an engine. An oil measuring rod is inserted within a tubular member and has a fastening means fixed to the rod which receives the upper end of the tubular member to maintain its position within the tubular member. The tubular rod is generally flat and elongated with at least one section on its lower portion twisted axially to cause the oil level indicating portion to be positioned approximately 90° to the adjacent portion. This will provide a centering of the rod within the tubular member in the measuring position, and prevent the oil level indicating portion of the rod from engaging the internal periphery of the tubular member and causing a smearing of the oil adhering to the rod thereby producing a false reading of the oil level in the reservoir.

This invention will be described in the following paragraphs and illustrated in the attached drawings.

Figure 1:
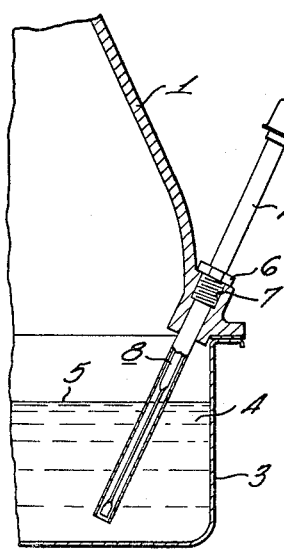
FIG. 1 illustrates the oil gauge mounted in the engine.

Referring to the drawings, a portion of the engine 1 provides a means for supporting a tube 2 in a manner to extend within the oil reservoir 3. The oil reservoir retains a body of oil 4 at a level defining a surface 5 indicating the oil level to be measured. A nut 6 is fixed to the outer periphery of the tube 2 and threadedly engages a threaded opening 7 in the engine 1.

Figures 2, 3:
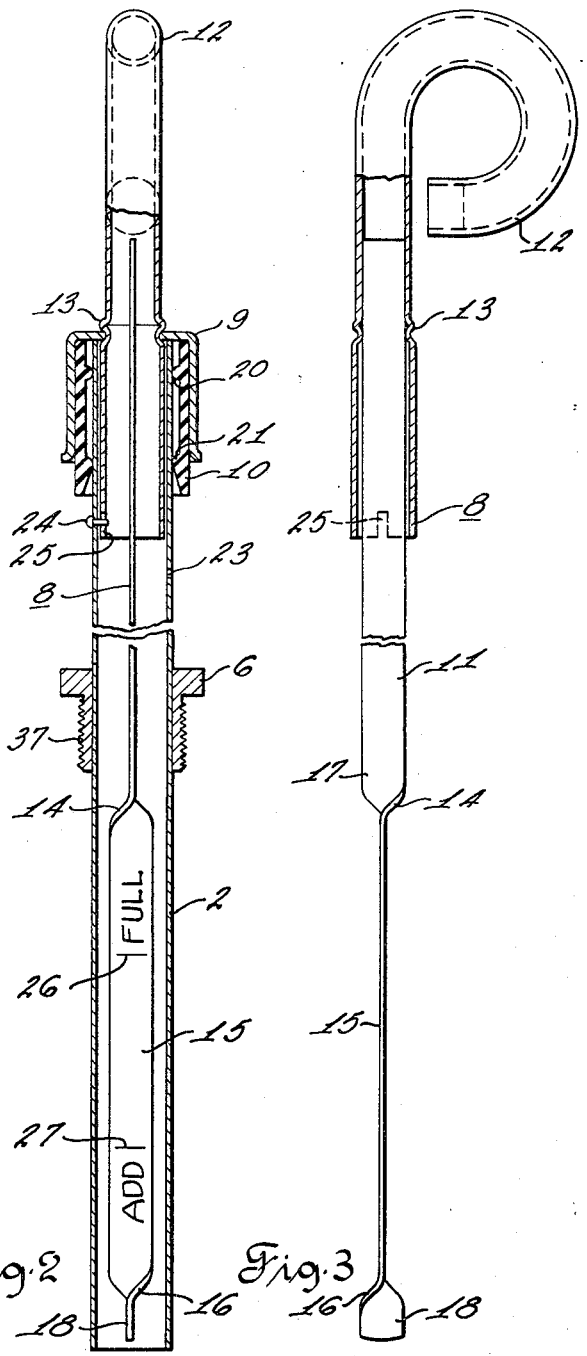
FIG. 2 illustrates an enlarged view of the oil gauge with portions in cross section.
FIG. 3 illustrates the oil measuring rod.

Referring to FIG. 2, the tube 2 is shown received within the nut 6 having a threaded portion 37. The tube 2 extends the full length of the measuring rod 8. The width of the measuring rod loosely fits within the tube 2. A substantial clearance for the purpose of illustration is shown between the lateral edges of a measuring rod 8 and the internal periphery of the tube 2. A closer tolerance than illustrated will provide a more accurate reading.

The upper end of the tube 2 is received within the retainer cap 9. The retainer cap 9 is constructed of a rigid material receiving a resilient sleeve 10 of material such as rubber which frictionally engages the external periphery of the tube 2. As the measuring rod 8 is inserted within the tube 2, the retainer cap 9 fits about the outer periphery of the tube 2 and retains the measuring rod 8 in its measuring position within the tube 2.

The measuring rod 8 is shown in FIG. 3 and includes a flat, elongated strip 11 fastened within the hollow handle 12 by means of the crimp 13. The hollow handle 12 is curled to form a loop adapted for handling by the engine operator. The measuring rod 8 is shown without the retainer cap 9 which is also rigidly fastened to the external periphery of the handle 12 when the measuring rod is assembled.

It is noted that the strip 11 extends below the handle 12 a substantial distance to permit the strip to extend into the oil reservoir 3. A twist 14 is formed immediately above the oil level indicating surface 15 and also immediately below the surface 15. The twist 14 as shown is a rotation of the lower portion of the strip 11 through an angle of 90°. In other words, adjacent portions of the strip 11 immediately above and below the twist 14 are rotated 90° relative to each other.

A second twist 16 is formed on the extreme lower end of the strip 11. The rotation of the portion immediately below the oil level indicating surface 15 is also rotated 90° to form a 90° rotational twist 16.

It can be seen that the portion 17 immediately above the twist 14 and the portion 18 immediately below the twist 16 form a centering means for the portion containing the oil level indicating surface 15. The portion of the rod between the twists 14 and 16 is centered within the tube 2 to provide an accurate reading on surface 15.

The angle at which the tube 2 is positioned withing the oil reservoir 3 is a convenient angle for the engine operator to remove the measuring rod 8. The greater the angle the measuring rod makes with a line normal to the surface 5 the more critical the centering of the rod is within the tube 2. It is also mentioned that in most instances a single twist would be sufficient to maintain the centering of the measuring rod 8 within the tube 2. Two twists 14 and 16 are shown to center the oil level indicating surface 15 when in the measuring position and to assure that the measuring surface will not contact the inner periphery of the tube 2 when it is withdrawn from the tube 2.

The operation of the invention will be described in the following paragraphs.

A measuring rod 8 is inserted within the tube 2 and forced downwardly until the retainer cap 9 frictionally engages the outer periphery of the tube 2 and the cover portion of the retainer cap 9 engages the end of the tube 2. The friction of the sleeve 10 having the annular ridges 20 and 21 maintain the axial position of the measuring rod 8 in the tube 2. The right angle relationship of the adjacent portions 17 and 18 relative to the oil level indicating surface 15 intermediate these two portions maintains a centered relationship within the tube 2. When the measuring rod 8 is in the measuring position it is always in the same position.

A vent hole 23 is provided to relieve any compressed air which may be associated with the positioning of the measuring rod 8 in the tube 2. The handle 12 curls in a plane normal to the plane of the surface 15. Generally this would be sufficient to naturally position measuring rod 8 at the same angular position in the tube 2. An added refinement, however, may be added to assure the proper angular position of the measuring rod 8 relative to the tube 2. This modification is illustrated in FIG. 2 wherein a pin 24 is fastened to the tube 2 and extends radially inward within the tube 2 and is received within a slot 25 formed in the lower portion of the handle 12.

The oil level indicating surface 15 is defined by a flat portion of the rod 8 having a mark 26 indicating when the surface 15 is at a level considered as full. The line 27 indicates that when the oil level is at this level, oil should be added to the reservoir.

The preferred embodiments of this invention have been illustrated and described. It is understood that other embodiments might be devised which would fall within the scope of the invention.

I claim:

1. An oil gauge comprising, a tubular member adapted for mounting on an engine and extending into an oil reservoir, a flat oil measuring rod extending within said member into the oil reservoir and having a handle means for withdrawing said rod from the tubular member, a retainer means on said rod engaging said tubular member for maintaining the rod in the oil level measuring position within said oil reservoir, an oil level indicating portion on the lower part of said measuring rod, at least one twisted portion adjacent said oil level indicating portion positioning adjacent portions of said rod rotated about the axis of the rod approximately 90° relative to each other thereby centering said rod in said tubular member when said rod is in the oil measuring position.

2. An oil gauge as set forth in claim 1 wherein said oil level indicating portion is positioned at the lower part of said rod intermediate two twists formed in the rod and said twists position the oil level indicating portion on said rod in a position rotated about the axis of the rod substantially 90° to the adjacent portions on said rod.

References Cited

UNITED STATES PATENTS

| 1,354,788 | 10/1920 | Wallace | 33—126.7 |
| 1,423,558 | 7/1922 | Gillet | 33—126.7 |
| 1,665,288 | 4/1928 | Taylor | 33—126.7 X |
| 1,948,310 | 2/1934 | Oliver et al. | 33—126.7 |
| 2,127,835 | 8/1938 | Tower | 33—126.7 |
| 2,239,402 | 4/1941 | Sachs | 33—126.7 |
| 2,953,939 | 9/1960 | Rains | 33—126.7 X |
| 3,147,554 | 9/1964 | Beattie | 33—126.7 |

ROBERT B. HULL, Primary Examiner